(12) United States Patent
Ni et al.

(10) Patent No.: US 11,636,004 B1
(45) Date of Patent: Apr. 25, 2023

(54) METHOD, ELECTRONIC DEVICE, AND COMPUTER PROGRAM PRODUCT FOR TRAINING FAILURE ANALYSIS MODEL

(71) Applicant: EMC IP Holding Company LLC, Hopkinton, MA (US)

(72) Inventors: Jiacheng Ni, Shanghai (CN); Min Gong, Shanghai (CN); GuangZhou Zhou, Shanghai (CN); Zijia Wang, WeiFang (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/545,258

(22) Filed: Dec. 8, 2021

(30) Foreign Application Priority Data

Oct. 22, 2021 (CN) .......................... 202111233948.8

(51) Int. Cl.
*G06F 11/07* (2006.01)
*G06F 18/214* (2023.01)
*G06N 7/01* (2023.01)

(52) U.S. Cl.
CPC .......... *G06F 11/079* (2013.01); *G06F 11/076* (2013.01); *G06F 11/0772* (2013.01); *G06F 18/214* (2023.01); *G06N 7/01* (2023.01)

(58) Field of Classification Search
CPC ... G06F 11/079; G06F 11/076; G06F 11/0772
See application file for complete search history.

(56) References Cited

U.S. PATENT DOCUMENTS

| | | |
|---|---|---|
| 5,463,768 A | 10/1995 | Cuddihy et al. |
| 6,173,418 B1 | 1/2001 | Fujino et al. |
| 2006/0184529 A1 | 8/2006 | Berg et al. |
| 2006/0195297 A1 | 8/2006 | Kubota et al. |
| 2009/0113246 A1 | 4/2009 | Sabato et al. |
| 2015/0089309 A1 | 3/2015 | Fu et al. |

(Continued)

OTHER PUBLICATIONS

Wikipedia, "Hamming Distance," https://en.wikipedia.org/wiki/Hamming_distance, Apr. 3, 2020, 6 pages.

(Continued)

*Primary Examiner* — Jigar P Patel
(74) *Attorney, Agent, or Firm* — Ryan, Mason & Lewis, LLP

(57) ABSTRACT

Embodiments of the present disclosure include a method, an electronic device, and a computer program product for training a failure analysis model. In a method for training a failure analysis model in an illustrative embodiment, at least one set of log files including multiple preprocessed log files is obtained, the at least one set of log files including a marked failure cause of a storage system, and preprocessed log files in the multiple preprocessed log files including one or more potential failure causes of the storage system and scores associated with the potential failure causes; a failure cause of the storage system is predicted according to a failure analysis model and based on the potential failure causes and the scores in the multiple preprocessed log files; and parameters of the failure analysis model are updated based on a probability that the predicted failure cause is the marked failure cause.

20 Claims, 5 Drawing Sheets

(56) References Cited

U.S. PATENT DOCUMENTS

| | | | |
|---|---|---|---|
| 2015/0331734 A1* | 11/2015 | Joshi | G06F 11/0709 714/33 |
| 2016/0098304 A1 | 4/2016 | Rosier | |
| 2016/0253229 A1 | 9/2016 | Sade et al. | |
| 2018/0267858 A1* | 9/2018 | Bacha | G06F 11/079 |
| 2019/0095313 A1 | 3/2019 | Xu et al. | |
| 2019/0258725 A1 | 8/2019 | Parthasarathy et al. | |
| 2019/0286628 A1 | 9/2019 | Zhou | |
| 2019/0354457 A1 | 11/2019 | Urmanov et al. | |
| 2019/0370347 A1 | 12/2019 | Levy et al. | |
| 2020/0371897 A1 | 11/2020 | Hansmann et al. | |
| 2021/0027205 A1* | 1/2021 | Sevakula | G06N 3/0445 |
| 2022/0236451 A1* | 7/2022 | Sun | G06N 20/00 |

OTHER PUBLICATIONS

Wikipedia, "Bag-of-Words Model," https://en.wikipedia.org/wiki/Bag-of-words_model, Mar. 31, 2020, 5 pages.

Wikipedia, "Levenshtein Distance," https://en.wikipedia.org/wiki/Levenshtein_distance, Apr. 7, 2020, 8 pages.

Wikipedia, "tf-idf," https://en.wikipedia.org/wiki/Tf-idf, Mar. 29, 2020, 7 pages.

Wikipedia, "Stack Trace," https://en.wikipedia.org/wiki/Stack_trace, Mar. 10, 2020, 2 pages.

Tensor Flow Core, "Embedding Projector," https://projector.tensorflow.org/, 2020, 1 pages.

J. Devlin et al., "BERT: Pre-training of Deep Bidirectional Transformers for Language Understanding," arXiv:1810.04805v2, May 24, 2019, 16 pages.

A. Vaswani et al., "Attention Is All You Need," arXiv:1706.03762v5, Dec. 6, 2017, 15 pages.

Y. Liu et al., "RoBERTa: A Robustly Optimized BERT Pretraining Approach," arXiv:1907.11692v1, Jul. 26, 2019, 13 pages.

NVM Express, "NVM Express, Revision 1.3," NVM Express, May 1, 2017, 282 pages.

Logdna, "What is LogDNA?" https://docs.logdna.com/docs/getting-started, Accessed Dec. 4, 2021, 1 page.

U.S. Appl. No. 17/002,333, filed in the name of Min Gong et al. Aug. 25, 2020, and entitled "Method, Electronic Device, and Computer Program Product for Analyzing Log File."

U.S. Appl. No. 17/236,107, filed in the name of Jiacheng Ni et al. Apr. 21, 2021, and entitled "Service Request Remediation with Machine Learning Based Identification of Critical Areas of Log Segments."

* cited by examiner

| Failure type | Score | Storage node identifier | Log file type |
|---|---|---|---|
| starvation_detect | 4.73 | NULL | ALERT |
| starvation_detect | 1.72 | X1-SC1 | MESSAGE |
| starvation_detect | 1.02 | X1-SC1 | MESSAGE |
| starvation_detect | 4.32 | X1-SC2 | MESSAGE |
| sc_be_fenced_out | 5.91 | X1-SC1 | MESSAGE |
| sc_be_fenced_out | 1.02 | X1-SC1 | MESSAGE |
| sc_be_fenced_out | 3.12 | X1-SC2 | MESSAGE |

FIG. 3

| Failure feature | Score |
|---|---|
| starvation_detect_NULL_ALERT | 4.73 |
| starvation_detect_X1-SC1_MESSAGE | 2.74 |
| starvation_detect_X1-SC2_MESSAGE | 4.32 |
| sc_be_fenced_out_X1-SC1_MESSAGE | 6.93 |
| sc_be_fenced_out_X1-SC2_MESSAGE | 3.12 |

FIG. 4

METHOD, ELECTRONIC DEVICE, AND COMPUTER PROGRAM PRODUCT FOR TRAINING FAILURE ANALYSIS MODEL

RELATED APPLICATIONS(S)

The present application claims priority to Chinese Patent Application No. 202111233948.8, filed Oct. 22, 2021, and entitled "Method, Electronic Device, and Computer Program Product for Training Failure Analysis Model," which is incorporated by reference herein in its entirety.

FIELD

Embodiments of the present disclosure relate to the field of data processing, and more particularly, to a method, an electronic device, and a computer program product for training a failure analysis model.

BACKGROUND

With the development of information technologies, the number of companies providing information services is increasing. Especially for companies that provide large-scale and complex information services, users are likely to encounter a variety of problems when using the information services provided by such companies. The problems may be caused by software defects, hardware or network problems, or operational errors. To this end, a team of technical support engineers needs to deal with a large number of service requests regarding problem reporting.

SUMMARY

In a first aspect of the present disclosure, a method for training a failure analysis model is provided. The failure analysis model is used to determine a failure cause of a storage system. The method includes obtaining at least one set of log files including multiple preprocessed log files, the at least one set of log files including a marked failure cause of a storage system, and preprocessed log files of the multiple preprocessed log files including one or more potential failure causes of the storage system and scores associated with the potential failure causes. The method further includes predicting a failure cause of the storage system according to the failure analysis model and based on the potential failure causes and the scores in the multiple preprocessed log files. The method further includes updating parameters of the failure analysis model based on a probability that the predicted failure cause is the marked failure cause.

In a second aspect of the present disclosure, an electronic device is provided. The electronic device includes a processor and a memory coupled to the processor, the memory having instructions stored therein which, when executed by the processor, cause the device to perform actions. The actions include obtaining at least one set of log files including multiple preprocessed log files, the at least one set of log files including a marked failure cause of a storage system, and preprocessed log files of the multiple preprocessed log files including one or more potential failure causes of the storage system and scores associated with the potential failure causes. The actions further include predicting a failure cause of the storage system according to a failure analysis model and based on the potential failure causes and the scores in the multiple preprocessed log files. The actions further include updating parameters of the failure analysis model based on a probability that the predicted failure cause is the marked failure cause.

In a third aspect of the present disclosure, a computer program product is provided. The computer program product is tangibly stored on a computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

From the following more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings:

FIG. 3 shows a schematic diagram of preprocessed files for some embodiments of the present disclosure;

FIG. 4 shows a schematic diagram of failure features according to some embodiments of the present disclosure, where the failure features are generated by aggregating scores in the preprocessed files of FIG. 3.

DETAILED DESCRIPTION

Figure 1:
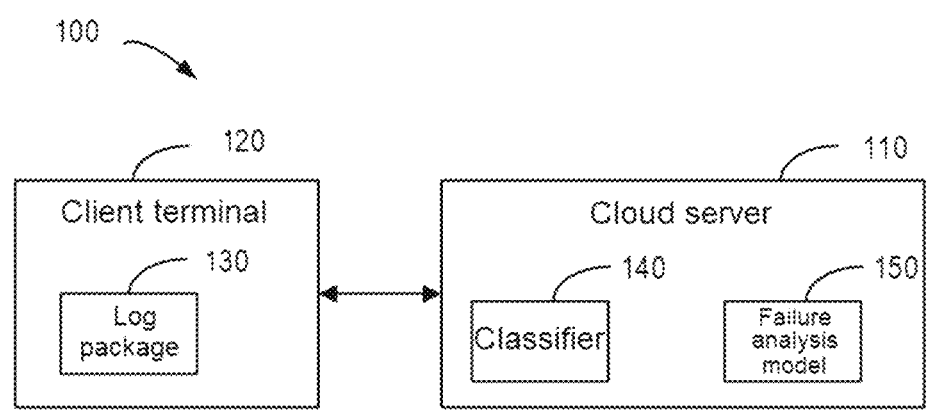
FIG. 1 shows a schematic diagram of an example environment in which embodiments of the present disclosure can be implemented.

The principles of the present disclosure will be described below with reference to several example embodiments illustrated in the accompanying drawings. Although the drawings show example embodiments of the present disclosure, it should be understood that these embodiments are merely described to enable those skilled in the art to better understand and then implement the present disclosure, and not in any way limit the scope of the present disclosure.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. Other explicit and implicit definitions may also be included below.

For large-scale and complex storage services, technical support engineers always handle a large number of customer service requests, including problem reports caused by software defects, hardware or network problems, or operational errors. How to infer a root cause of a system failure from a log package (consisting of several related log files, each consisting of consecutive log lines within a certain time interval) is a useful task in a service request classification process, because a client terminal is usually required to upload a log package (consisting of the most recent log files) to further classify failure causes. Most methods for analyzing failures from logs are developed for "log files" rather than "log packages."

Embodiments of the present disclosure provide a solution for training a failure analysis model. The failure analysis model is used to determine a failure cause of a storage system. In a model training process, at least one set of log files including multiple preprocessed log files is obtained, and the preprocessed log files include one or more potential failure causes of the storage system and scores associated with the potential failure causes. Then, based on the potential failure causes and the scores, a failure cause of the storage system is predicted according to the failure analysis model. Parameters of the failure analysis model are updated based on a probability that the predicted failure cause is a marked failure cause included in the at least one set of log files.

According to embodiments described herein, the trained failure analysis model can be used to analyze a failure cause with respect to a "log package" uploaded by a client terminal. While improving the efficiency of failure analysis, it can help inexperienced engineers to handle customer service requests.

The basic principles and some example implementations of the present disclosure will be described below with reference to the accompanying drawings. It should be understood that these example embodiments are given only to enable those skilled in the art to better understand and then implement the embodiments of the present disclosure, and are not intended to limit the scope of the present disclosure in any way.

FIG. 1 shows a schematic diagram of example environment 100 in which embodiments of the present disclosure can be implemented. As shown in FIG. 1, environment 100 includes cloud server 110 and client terminal 120. When client terminal 120 has a failure, log package 130 will be generated. Log package 130 includes multiple log files. In order to analyze a failure cause of client terminal 120, client terminal 120 is required to upload log package 130 to cloud server 110. Client terminal 120 may be user equipment or a workstation. Examples of client terminal 120 may include, but are not limited to, a cellular mobile phone, a tablet device, a laptop computer, and the like.

Cloud server 110 may preprocess the log files in log package 130 uploaded by client terminal 120. Then, preprocessed log package 130 is input into failure analysis model 150 that is trained, so as to analyze a system failure cause of client terminal 120. A training method of failure analysis model 150 will be described in detail below with reference to FIG. 2.

It should be understood that the structure and functions of environment 100 are described for illustrative purposes only and do not imply any limitation to the scope of the present disclosure. For example, the embodiments of the present disclosure may also be applied to an environment different from environment 100. In addition, only one log package is shown in FIG. 1, but the number of log packages is not limited to one, and there may be more or fewer log packages.

Figure 2:
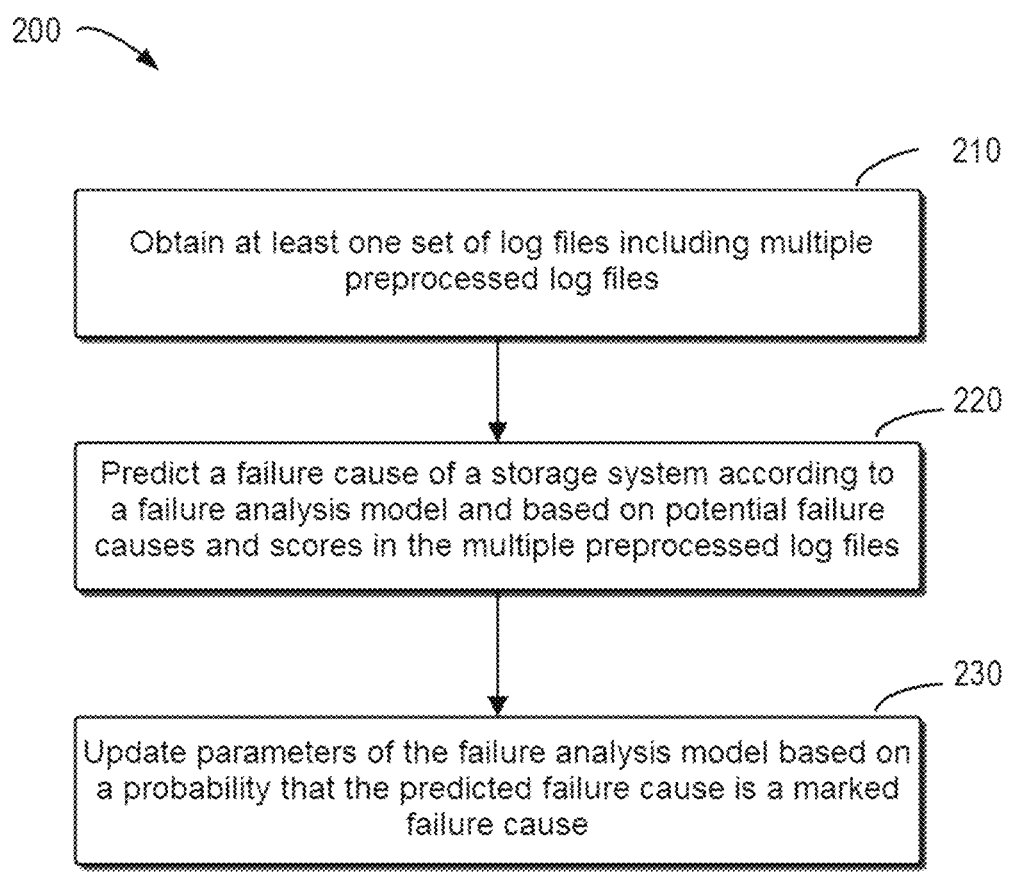
FIG. 2 shows a flow chart of an example method for training a failure analysis model according to embodiments of the present disclosure.

FIG. 2 shows a flow chart of example method 200 for training a failure analysis model according to embodiments of the present disclosure. Method 200 may be implemented by, for example, cloud server 110 as shown in FIG. 1. It should be understood that method 200 may also include additional actions not shown and/or may omit actions shown, and the scope of the present disclosure is not limited in this regard. Method 200 will be described in detail below in combination with FIG. 1.

At block 210, cloud server 110 obtains at least one set of log files including multiple preprocessed log files. The multiple preprocessed log files are obtained through preprocessing, by cloud server 110, log files in log package 130 uploaded by client terminal 120. The preprocessing is performed on a single log file. The preprocessing of the log file will be briefly described below. It should be understood that the preprocessing method described below is only illustrative, other methods may also be used to preprocess a log file, and the scope of the present disclosure is not limited in this respect.

In the preprocessing, each log file in log package 130 is divided into multiple log segments, and each log segment includes multiple log lines. By aggregating the log lines to form a log pattern, each log line can be identified as a log identifier (such as a LogDNA ID or other log identifier), and the log segments can be converted into a series of log identifiers. Then, the series of log identifiers are used as a feature representation of the log segments to be input to a model such that classifier 140 for failure classification of the log segments is constructed. Classifier 140 can be used to scan the log files and output a classification score of each log segment. If the classification score exceeds a failure classification threshold, it means that the log segment may indicate a failure type associated with the classification score. In some embodiments, other classifiers may also be used to scan the log files.

Thereafter, technical support engineers can analyze an output result of classifier 140. The engineers determine a system failure cause based on their own experience, and manually mark the system failure cause. Each log package 130 corresponds to a failure cause. Log files of multiple log packages 130 are preprocessed to prepare for training data.

Thus, the log files in preprocessed log packages 130 are used as multiple preprocessed log files to form a set of log files. The set of log files include a failure cause of a storage system of client terminal 120, the failure cause being manually marked. Preprocessed log files of the multiple preprocessed log files include one or more potential failure causes of the storage system and scores associated with the potential failure causes. The potential failure causes may be, for example, represented by fields such as starvation_detect and sc_be_fenced_out.

In some embodiments, the preprocessed log files also include log file types associated with the potential failure causes, such as ALERT and IVIES SAGE. In some embodiments, the preprocessed log files further include storage node identifiers associated with the log file types, such as storage node identifiers X1-SC1 and X1-SC2. It is worth noting that there is no storage node identifier associated with the log file type of ALERT, which may be represented by NULL.

It is difficult to perform fine-grained analysis on the entire log package, because the time interval for fine-grained analysis will be too long (usually greater than 24 hours), and the size of data for fine-grained analysis is too large (usually greater than 1 GB). Therefore, in some embodiments, the multiple preprocessed log files may be divided by multiple time windows. Then, divided multiple preprocessed log files within time windows of the multiple time windows are obtained and used as at least one set of log files. The time window may be, for example, 1 hour, or 0.5 hours to several hours.

At block 220, the failure cause of the storage system is predicted according to failure analysis model 150 and based on the potential failure causes and the scores in the multiple preprocessed log files. In some embodiments, the scores in the multiple preprocessed log files are aggregated based on failure types of the potential failure causes to generate failure features. The failure feature indicates at least a failure type and an aggregated score for the corresponding failure type. Then, the failure cause of the storage system is predicted according to failure analysis model 150 and based on the generated failure features.

In some embodiments, the scores in the multiple preprocessed log files can be aggregated based on the failure types of the potential failure causes and log file types associated with the potential failure causes and included in the preprocessed log files of the multiple preprocessed log files.

In some embodiments, the scores in the multiple preprocessed log files may also be aggregated based on the failure types of the potential failure causes, the log file types, and storage node identifiers associated with the log file types and included in the preprocessed log files of the multiple preprocessed log files. This will be described in detail hereinafter in combination with FIG. 3 and FIG. 4.

At block 230, parameters of failure analysis model 150 are updated based on a probability that the predicted failure cause is the marked failure cause. In some embodiments, the updated parameters are used to update failure analysis model 150 based on the probability that the predicted failure cause is the marked failure cause being less than a threshold. The threshold may be obtained based on experiments, or may be set by engineers from experience. For example, the threshold may be 70%. An algorithm for training failure analysis model 150 may be a random forest algorithm, a logistic regression algorithm, or a softmax algorithm. The number of training iterations may also be set as required. For example, it may be 100 iterations.

In this way, training data is prepared for log package 130 to train failure analysis model 150, so that trained failure analysis model 150 can be used to analyze a failure cause for log package 130. Compared with the case of predicting multiple potential failure causes for log files, the requirement for engineers' experience in failure analysis is low, and the failure analysis efficiency is improved.

FIG. 3 shows a schematic diagram of preprocessed files according to some embodiments of the present disclosure. FIG. 4 shows a schematic diagram of failure features according to some embodiments of the present disclosure, where the failure features are generated by aggregating scores in the preprocessed files of FIG. 3. Two failure types starvation_detect and sc_be_fenced_out, two log file types ALERT and MESSAGE, and two storage node identifiers X1-SC1 and X1-SC2 associated with the log file type MESSAGE are shown in FIG. 3. There is no storage node identifier associated with the log file type ALERT, so it is shown as NULL in FIG. 3.

After the scores are aggregated based on the failure types, the log file types, and the storage node identifiers shown in FIG. 3, a list of failure features as shown in FIG. 4 is obtained. Each failure feature indicates the respective failure type, log file type, storage node identifier, and aggregated score.

It should be understood that although FIG. 3 shows that the preprocessed files include failure types, log file types, and storage node identifiers, the preprocessed files may also include other additional information. Although FIG. 4 shows a result of aggregating the scores based on the failure types, the log file types, and the storage node identifiers shown in FIG. 3, aggregation may also be performed based on one or more of the failure types, the log file types, and the storage node identifiers. In some embodiments, the scores can also be aggregated based on other additional information in the preprocessed files.

Figure 5:
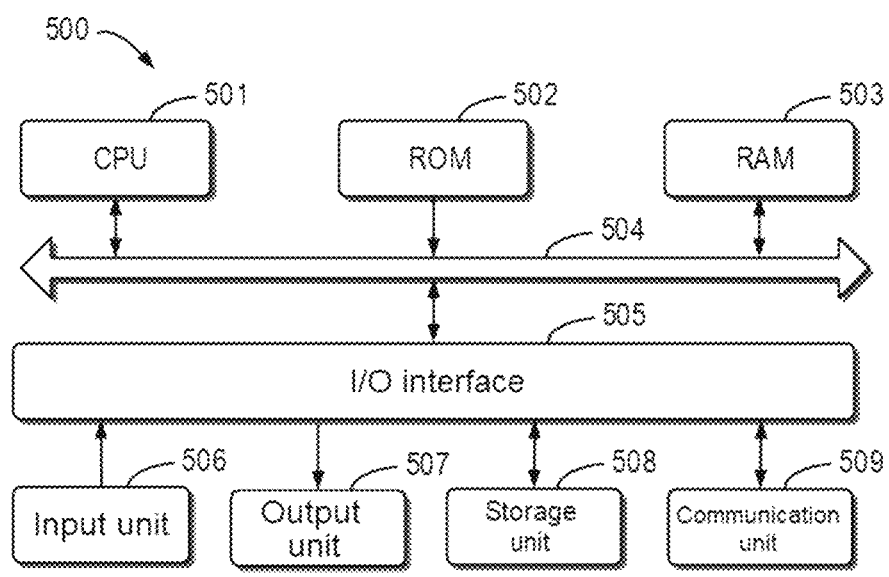
FIG. 5 shows a block diagram of an example device that can be used to implement embodiments of the present disclosure.

FIG. 5 shows a schematic block diagram of example device 500 that may be used to implement embodiments of the present disclosure. For example, cloud server 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 57, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by CPU 501. For example, in some embodiments, method 200 may be implemented as a computer software program that is tangibly contained in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method for training a failure analysis model, the failure analysis model being used to determine a failure cause of a storage system, and the method comprising:
   obtaining at least one set of log files including multiple preprocessed log files, the at least one set of log files including a marked failure cause of the storage system, and preprocessed log files in the multiple preprocessed log files including one or more potential failure causes of the storage system and scores associated with the potential failure causes;

predicting a failure cause of the storage system according to the failure analysis model and based on the potential failure causes and the scores in the multiple preprocessed log files; and updating parameters of the failure analysis model based on a probability that the predicted failure cause is the marked failure cause;

wherein each of at least a subset of preprocessed log files comprises a plurality of fields for respective ones of a failure type, a log file type, an identifier of a storage node of the storage system, and a score for the corresponding preprocessed log file; and wherein a failure feature is determined for use in the failure analysis model at least in part by aggregating the scores for multiple ones of the preprocessed log files based on one or more of the failure type, the storage node identifier and the log file type.

2. The method according to claim 1, wherein predicting a failure cause of the storage system comprises:

aggregating the scores in the multiple preprocessed log files based on failure types of the potential failure causes to generate failure features, the failure feature at least indicating a failure type and the aggregated score for the corresponding failure type; and predicting a failure cause of the storage system according to the failure analysis model and based on the failure features.

3. The method according to claim 2, wherein aggregating the scores in the multiple preprocessed log files comprises:

aggregating the scores based on the failure types of the potential failure causes and log file types associated with the potential failure causes and included in the preprocessed log files of the multiple preprocessed log files.

4. The method according to claim 3, wherein aggregating the scores in the multiple preprocessed log files further comprises:

aggregating the scores based on the failure types of the potential failure causes, the log file types, and storage node identifiers associated with the log file types and included in the preprocessed log files of the multiple preprocessed log files.

5. The method according to claim 1, further comprising:
using the parameters to update the failure analysis model based on the probability being less than a threshold.

6. The method according to claim 1, wherein obtaining at least one set of log files further comprises:

dividing the multiple preprocessed log files by multiple time windows; and obtaining the divided multiple preprocessed log files within time windows in the multiple time windows as the at least one set of log files.

7. The method according to claim 1, wherein the failure feature is determined for use in the failure analysis model at least in part by aggregating the scores for two or more of the preprocessed log files that have the same failure types, the same log files types and the same storage node identifiers.

8. An electronic device, comprising:
a processor; and
a memory coupled to the processor, the memory having instructions stored therein, wherein the instructions, when executed by the processor, cause the electronic device to perform actions for training a failure analysis model, the failure analysis model being used to determine a failure cause of a storage system, the actions comprising:

obtaining at least one set of log files including multiple preprocessed log files, the at least one set of log files including a marked failure cause of the storage system, and preprocessed log files in the multiple preprocessed log files including one or more potential failure causes of the storage system and scores associated with the potential failure causes;

predicting a failure cause of the storage system according to the failure analysis model and based on the potential failure causes and the scores in the multiple preprocessed log files; and updating parameters of the failure analysis model based on a probability that the predicted failure cause is the marked failure cause;

wherein each of at least a subset of preprocessed log files comprises a plurality of fields for respective ones of a failure type, a log file type, an identifier of a storage node of the storage system, and a score for the corresponding preprocessed log file; and wherein a failure feature is determined for use in the failure analysis model at least in part by aggregating the scores for multiple ones of the preprocessed log files based on one or more of the failure type, the storage node identifier and the log file type.

9. The electronic device according to claim 8, wherein predicting a failure cause of the storage system comprises:

aggregating the scores in the multiple preprocessed log files based on failure types of the potential failure causes to generate failure features, the failure feature at least indicating a failure type and an aggregated score for the corresponding failure type; and predicting a failure cause of the storage system according to the failure analysis model and based on the failure features.

10. The electronic device according to claim 9, wherein aggregating the scores in the multiple preprocessed log files comprises:

aggregating the scores based on the failure types of the potential failure causes and log file types associated with the potential failure causes and included in the preprocessed log files of the multiple preprocessed log files.

11. The electronic device according to claim 10, wherein aggregating the scores in the multiple preprocessed log files further comprises:

aggregating the scores based on the failure types of the potential failure causes, the log file types, and storage node identifiers associated with the log file types and included in the preprocessed log files of the multiple preprocessed log files.

12. The electronic device according to claim 8, wherein the actions further comprise:
using the parameters to update the failure analysis model based on the probability being less than a threshold.

13. The electronic device according to claim 8, wherein obtaining at least one set of log files further comprises:

dividing the multiple preprocessed log files by multiple time windows; and obtaining the divided multiple preprocessed log files within time windows in the multiple time windows as the at least one set of log files.

14. A computer program product that is tangibly stored on a non-transitory computer-readable storage medium and comprises machine-executable instructions, wherein the machine-executable instructions, when executed by a machine, cause the machine to perform a method for training a failure analysis model, the failure analysis model being used to determine a failure cause of a storage system, the method comprising:

obtaining at least one set of log files including multiple preprocessed log files, the at least one set of log files including a marked failure cause of the storage system, and preprocessed log files in the multiple preprocessed log files including one or more potential failure causes of the storage system and scores associated with the potential failure causes;

predicting a failure cause of the storage system according to the failure analysis model and based on the potential failure causes and the scores in the multiple preprocessed log files; and updating parameters of the failure analysis model based on a probability that the predicted failure cause is the marked failure cause;

wherein each of at least a subset of preprocessed log files comprises a plurality of fields for respective ones of a failure type, a log file type, an identifier of a storage node of the storage system, and a score for the corresponding preprocessed log file; and wherein a failure feature is determined for use in the failure analysis model at least in part by aggregating the scores for multiple ones of the preprocessed log files based on one or more of the failure type, the storage node identifier and the log file type.

15. The computer program product according to claim 14, wherein predicting a failure cause of the storage system comprises:

aggregating the scores in the multiple preprocessed log files based on failure types of the potential failure causes to generate failure features, the failure feature at least indicating a failure type and the aggregated score for the corresponding failure type; and predicting a failure cause of the storage system according to the failure analysis model and based on the failure features.

16. The computer program product according to claim 15, wherein aggregating the scores in the multiple preprocessed log files comprises:

aggregating the scores based on the failure types of the potential failure causes and log file types associated with the potential failure causes and included in the preprocessed log files of the multiple preprocessed log files.

17. The computer program product according to claim 16, wherein aggregating the scores in the multiple preprocessed log files further comprises:

aggregating the scores based on the failure types of the potential failure causes, the log file types, and storage node identifiers associated with the log file types and included in the preprocessed log files of the multiple preprocessed log files.

18. The computer program product according to claim 14, further comprising:

using the parameters to update the failure analysis model based on the probability being less than a threshold.

19. The computer program product according to claim 14, wherein obtaining at least one set of log files further comprises:

dividing the multiple preprocessed log files by multiple time windows; and obtaining the divided multiple preprocessed log files within time windows in the multiple time windows as the at least one set of log files.

20. The computer program product according to claim 14, wherein the failure feature is determined for use in the failure analysis model at least in part by aggregating the scores for two or more of the preprocessed log files that have the same failure types, the same log files types and the same storage node identifiers.

\* \* \* \* \*